(12) United States Patent
Perez, Jr.

(10) Patent No.: US 7,082,981 B2
(45) Date of Patent: Aug. 1, 2006

(54) RETRACTABLE PET GUARD

(76) Inventor: Jose R. Perez, Jr., 122 E. 116th St., Apt. 5E, New York, NY (US) 10029

( * ) Notice: Subject to any disclaimer, the term of this patent is extended or adjusted under 35 U.S.C. 154(b) by 0 days.

(21) Appl. No.: 10/858,082

(22) Filed: Jun. 2, 2004

(65) Prior Publication Data

US 2005/0173078 A1    Aug. 11, 2005

Related U.S. Application Data

(60) Provisional application No. 60/542,941, filed on Feb. 9, 2004.

(51) Int. Cl.
*A47H 1/00* (2006.01)
(52) U.S. Cl. .......................... 160/24; 160/99
(58) Field of Classification Search .................. 160/24, 160/30, 27, 28, 29, 99, 100, 290.1
See application file for complete search history.

(56) References Cited

U.S. PATENT DOCUMENTS

| | | | |
|---|---|---|---|
| 337,192 A | 3/1886 | Peck | |
| 832,335 A * | 10/1906 | McDonald | .................. 160/264 |
| 834,145 A | 10/1906 | Landsberg | |
| 1,216,794 A * | 2/1917 | Garman | ........................ 160/31 |
| 1,295,712 A | 2/1919 | Drew | |
| 1,459,155 A * | 6/1923 | Ioor | ............................ 160/25 |
| 1,461,588 A * | 7/1923 | Trickey | ........................ 160/28 |
| 1,857,911 A | 5/1932 | Johnson | |
| 2,207,856 A | 7/1940 | Gieser | |
| 2,379,120 A | 6/1945 | Turner | |
| 2,455,112 A | 11/1948 | Christison | |
| 2,822,040 A * | 2/1958 | Petrick et al. | ................. 160/24 |
| 3,220,464 A * | 11/1965 | Wise | ........................... 160/24 |
| 3,911,990 A | 10/1975 | Hoover et al. | |
| 4,651,797 A | 3/1987 | Lange | |
| 4,660,144 A * | 4/1987 | Walsh | .......................... 718/1 |
| 5,123,474 A | 6/1992 | Smith | |
| 5,337,818 A | 8/1994 | Coad | |
| 5,505,244 A | 4/1996 | Thumann | |
| 5,636,679 A * | 6/1997 | Miller et al. | ................. 160/317 |

(Continued)

FOREIGN PATENT DOCUMENTS

WO    WO 03/102345    12/2003

*Primary Examiner*—David Purol
(74) *Attorney, Agent, or Firm*—Richard C. Litman

(57) ABSTRACT

The retractable pet guard has a screen or net extending retractably from a housing which is temporarily secured to either the latch edge of a door or to the latch side of a door frame. The extension edge of the net secures removably to the opposite member of the door assembly, extending across the doorway when the door is opened. The device extends from the floor upwardly to about the level of the doorknob and latch, thereby preventing the escape of pets and/or small children while still permitting a transaction(s) to take place through the open doorway above the screen or net. A stop may be provided to prevent door closure due to the pull of the retraction mechanism, and/or a retraction stop may be provided to prevent retraction as desired. The device may also be installed in a window opening to serve as a window screen, if desired.

9 Claims, 5 Drawing Sheets

U.S. PATENT DOCUMENTS

| | | | | |
|---|---|---|---|---|
| 5,702,143 A * | 12/1997 | Shimazaki | ............... | 296/24.43 |
| 6,029,609 A | 2/2000 | Bahar et al. | | |
| 6,089,302 A * | 7/2000 | Britt | ............... | 160/98 |
| 6,375,165 B1 * | 4/2002 | Sherratt et al. | ............... | 256/24 |
| 6,435,250 B1 * | 8/2002 | Pichik et al. | ............... | 160/24 |
| 6,435,254 B1 | 8/2002 | Todd et al. | | |
| 6,478,070 B1 | 11/2002 | Poppema | | |
| 6,575,435 B1 * | 6/2003 | Kotzen | ............... | 256/24 |
| 6,733,204 B1 * | 5/2004 | Paniccia | ............... | 404/6 |
| 6,807,999 B1 * | 10/2004 | Bowen et al. | ............... | 160/24 |

* cited by examiner

RETRACTABLE PET GUARD

CROSS-REFERENCE TO RELATED APPLICATION

This application claims the benefit of U.S. Provisional Patent Application Ser. No. 60/542,941, filed Feb. 9, 2004.

BACKGROUND OF THE INVENTION

1. Field of the Invention

The present invention relates generally to temporary barriers, guards, and the like for selectively preventing passage of persons or animals from one point to another. More specifically, the present invention comprises a retractable pet guard which may be extended across the lower portion of a door opening to prevent the escape of pets when the door is open. The present invention automatically extends and retracts when the door is opened and closed, and may be disconnected from one side of the doorway or removed from the doorway as desired for passage through the doorway.

2. Description of the Related Art

In today's society, perhaps the majority of households include pets of some sort. In many instances, such household domestic animals, e.g., cats, small dogs, ferrets, etc., are free to roam throughout the household, but are restricted from going outdoors for various reasons. This is particularly true in the city, where traffic can be extremely hazardous to small animals.

Yet, pets tend to be curious, and are often inclined to explore the outdoors if given the opportunity. Exterior doors often must be opened for various reasons, such as receiving a parcel or food or other order, signing for mail received, greeting visitors or sales persons, etc. As a result, it can be difficult to juggle a delivery of some sort through an opened doorway while simultaneously preventing a pet from escaping. While a full screen door will certainly prevent the escape of a pet from the interior of the home, such conventional full size screens which extend over the entire span and height of the doorway do not allow the passage of goods or articles through the doorway. When they are opened to allow such passage, they leave the doorway completely open, thus permitting a pet to escape if the owner is not ready to prevent such escape.

The present invention provides a solution to this problem by providing a retractable pet guard which may be selectively extended across the lower portion of a door opening, with the upper portion of the door opening remaining clear for the passage of goods or articles thereacross. The present pet guard essentially comprises a flexible net or screen which is rolled upon a spring-biased roller and secured to the latch edge of the door or to the latch side of the jamb. The extendible edge of the mesh or screen is temporarily secured to the opposite side of the opening. The device may remain in place as desired, with the net or screen extending automatically across the lower portion of the door opening whenever the door is opened. The device may be removed for storage when its use is not needed. Another embodiment provides for installation in the lower portion of a casement window or the like, where it automatically extends to provide a screen whenever the window is opened.

A discussion of the related art of which the present inventor is aware, and its differences and distinctions from the present invention, is presented below.

U.S. Pat. No. 337,192 issued on Mar. 2, 1886 to Theodore S. Peck, titled "Adjustable Extension Screen," describes a fine mesh screen on a roller, with the screen extending laterally across a window opening between the lower edge of the sash and the sill. The screen may be pulled out to whatever span is required, depending upon the width of the window opening. However, the Peck screen does not include any form of housing surrounding the screen to protect the screen when retracted, and as the device is configured for the roller to span an opening, sharp pins are provided at each end of the roller to penetrate the bottom of the sash and the sill to hold the roller in place. This is unsuitable where pets and/or toddlers may come in contact with the device. Moreover, as the Peck screen is not adapted to span a doorway, Peck makes no provision to hold the movable part of the opening (i.e., sash, for the Peck device) open to prevent its swinging shut. The present invention may include an integral door stop and/or retraction stop, to allow the door to remain open and/or to preclude any biasing effect of the retraction spring urging the door closed.

U.S. Pat. No. 834,145 issued on Oct. 23, 1906 to Theodore Landsberg, titled "Window Screen," describes a retractable screen which is permanently installed upon the window sill and which secures temporarily across the span of the window opening immediately adjacent the sash (not to the movable sash, as in the case of at least one embodiment of the present invention). This permits the sash to be raised or lowered independently of the position of the screen, which defeats the purpose of the screen. Landsberg also does not provide any form of housing to protect the screen, nor does he provide any means of temporarily securing his device across the lower portion of a doorway and/or holding the door in an open position against the biasing force of the retraction mechanism, which features are components of the present invention.

U.S. Pat. No. 1,295,712 issued on Feb. 25, 1919 to George W. Drew, titled "Coiling Closure," describes a series of interconnected, narrow slats which retract upon a roller and which may be extended across a window opening or the like. The device is clearly intended to span the entire opening from top to bottom, as the lower edge is provided with rollers and the upper edge rides along the upper edge of the window frame. No external housing per se is provided, as the retraction spring mechanism is permanently installed within the hollow volume of the column along one side of the window.

U.S. Pat. No. 1,857,911 issued on May 10, 1932 to Earle F. Johnson, titled "Window Ventilator," describes an extension which is angled into the room or structure from the bottom of the window opening. A retractable screen extends across the horizontal span between the top of the extension and the lower edge of the sash, thence extending upwardly and securing to the lower sash rail member. The device is permanently installed, with the ventilator structure serving as a housing for the roller screen. The screen cannot be readily removed from the ventilator and window sash rail, nor can the ventilator be readily removed from its permanent installation at the bottom of the window.

U.S. Pat. No. 2,207,856 issued on Jul. 16, 1940 to John C. Gieser, titled "Window Screen," describes another retractable window screen contained on a roller in a housing which may be temporarily installed across the lower portion of a window opening. The Gieser device appears to be more closely related to the device of the '145 U.S. Patent to Landsberg, discussed further above, than to the present invention. No means for locking the screen at a given extension, or for precluding closure of the opening due to the pull of the spring-biased screen thereacross, is provided by Gieser.

U.S. Pat. No. 2,379,120 issued on Jun. 26, 1945 to Howard H. Turner, titled "Door Construction," describes a combination rigid window pane and roller screen permanently installed within a door. The window pane resides in a pocket in the lower portion of the door when retracted, with the screen extending from a roller at the top of the door to cover the open upper portion of the door. When the window is retracted, the screen is drawn down from the roller to cover the open upper portion, and when the window is raised, the screen retracts upon its roller. Thus, the opening in the upper portion of the door remains closed at all times, precluding passage of any articles therethrough. Moreover, the Turner door does nothing to block the lower portion of the door opening when the door is opened, as provided by the present invention.

U.S. Pat. No. 2,455,112 issued on Nov. 30, 1948 to William F. Christison, titled "Door Guard," describes a device operating on the pantograph principle and which extends from the bottom edge to the top edge of the door, with a fan-shaped guard extension extending from the upper hinged edge of the door across the arcuate gap at the top of the opened door. Christison states that his device is intended to provide a "burglar proof" guard, and thus spans the entire opening and precludes the passage of any goods or articles through a portion of the door opening, as allowed by the present invention. The rigid construction of the Christison device precludes retraction upon a roller, as provided by the present invention.

U.S. Pat. No. 3,911,990 issued on Oct. 14, 1975 to D. Eugene Hoover et al., titled "Window And Screen Combination," describes an assembly much like the device of the '120 U.S. Patent to Turner, discussed further above. The Hoover et al. device includes a fixed window pane, a horizontally sliding window pane, and a screen attached to one edge of the sliding pane, with the screen deploying from a roller when the sliding pane is moved directly over the fixed pane. The Hoover et al. device thus has the same problem of precluding transfer of articles through the window opening at all times, as noted in the Turner '120 U.S. patent.

U.S. Pat. No. 4,651,797 issued on Mar. 24, 1987 to Al E. Lange, titled "Roll-Up Screen Door," describes a screen extending the full height of the doorway, and which is contained on a roller which attaches along one edge of the vertical jamb. The opposite edge of the screen pulls from the roller to hook to the opposite vertical jamb. Thus, when the Lange screen is deployed, the door opening is completely blocked to the passage of anything larger than the screen mesh. In order to pass objects through the doorway, the entire screen must be rolled up, which opens the lower portion of the doorway to allow the potential escape of pets from the interior of the home.

U.S. Pat. No. 5,123,474 issued on Jun. 23, 1992 to Richard C. Smith, titled "Roll-Up Closure Device," describes a roller screen dimensioned to extend across a conventional garage door opening. A motorized roller is installed across the top of the opening, with the screen running in vertical tracks along each side of the opening. While this device may be extended to cover only a portion of the opening, it extends downwardly from the top with the lower portion of any partial extension thus remaining open, which would allow pets to escape. This is exactly the opposite coverage provided by the present pet guard.

U.S. Pat. No. 5,337,818 issued on Aug. 16, 1994 to George L. Coad, titled "Rollaway Extendable Planar Fabric Enclosure," describes another rolled sheet of material, with the roller disposed along one side of the opening. A drawbar is used to brace the sheet to its fully opened extent. No external housing is disclosed to enclose the rolled material, and the roller upon which the material is wound is permanently attached to the door frame or other structure; it cannot be readily removed. No disclosure is made by Coad of any means for extending his screen or fabric partially across an opening or passage, as his drawbar system for holding the fabric in place cannot be locked at a partially extended position.

U.S. Pat. No. 5,505,244 issued on Apr. 9, 1996 to Pierce A. Thumann, titled "Retractable Covering For A Door Opening," describes another full screen assembly which extends from a roller attached along one side of the door frame. The Thumann screen attaches to the outside of the door opening, away from the travel of the door as it pivots upon its hinges. This is necessary in order to allow the door to open away from the screen when the screen is extended across the doorway. The Thumann screen is more closely related to the screens of the Lange '797 and Smith '474 U.S. Patents than it is to the present invention, as Thumann does not provide a screen which leaves a portion of the door opening clear when the door is opened, as does the present invention.

U.S. Pat. No. 6,029,609 issued on Feb. 29, 2000 to Reuben Bahar et al., titled "Foldable Pet Shelter," describes a screened enclosure which extends inwardly from a conventional pet door at the bottom of an exterior door. The device folds to allow the door to be opened completely against another structure, e.g., wall, furniture, etc. However, when the device is folded to allow the door to be opened, it does nothing to prevent a pet from exiting through the pet door, or through the opening between the door and door jamb when the door is opened.

U.S. Pat. No. 6,089,302 issued on Jul. 18, 2000 to Merrie Britt, titled "Extensible Doorway Barrier," describes a rolled screen on a spring-biased roller, with the roller being permanently attached to the door jamb. Hooks are provided along the edge of the door, to which the free end of the screen may be temporarily secured. There are several distinctions between the Britt barrier and the present pet guard. The Britt barrier is relatively simple, and lacks many of the features of the present invention. Britt does not provide a housing for her barrier screen, which would allow pets (particularly cats) to use the mesh as a claw sharpening device, likely causing damage to the screen. Also, the Britt device is permanently attached to the door jamb, and must remain in place at all times. The present pet guard may be removed as desired, with only a pair of unobtrusive attachments remaining behind on the mounting structure for the roller housing. It is further noted that Britt does not provide any means of securing the door when her barrier is extended thereacross. As the screen is being urged to a retracted position at all times due to the roller spring, the device is constantly applying a tensile force urging the door closed whenever it, is deployed. The present pet guard may include a stop retractably extending therefrom to selectively engage the floor, in order to hold the door open. Another device may be provided on the roller itself, to lock the position of the roller as desired and prevent retraction of the screen, thereby allowing the door to remain open.

U.S. Pat. No. 6,435,254 issued on Aug. 20, 2002 to John M. Todd et al., titled "Flexible Retractable Door," describes a large number of variations on a coiled plastic sheet which tends to coil within a retracted state within a housing. FIG. 22 of the Todd et al. U.S. patent illustrates a doorway with a coiled screen disposed vertically along one edge thereof, with the screen being extendible across the doorway. However, the Todd et al. screen extends from the threshold to the lintel of the doorway, completely blocking the doorway to the passage of anything larger than the screen mesh when extended thereacross. The Todd et al. device also requires upper and lower tracks or rails for the two edges of the device, with the tracks or rails remaining in place at all times, whether the screen or sheet is deployed or not. This is clearly unworkable for use as a temporary barricade to block the lower portion of a doorway, as provided by the present invention. In such a situation, the upper track or rail must remain in place, resulting in a hurdle which must be crossed whenever someone wished to pass through the doorway. The present barrier needs no such permanent track, and retracts completely clear of the doorway when not needed.

U.S. Pat. No. 6,478,070 issued on Nov. 12, 2002 to John Poppema, titled "Retractable Flexible Door Method And Apparatus," describes another retractable screen arrangement closely resembling the door screen embodiment of the Todd et al. '254 U.S. Patent discussed immediately above. The same problems exist with the Poppema screen, i.e., a permanent frame is required to be installed within the door opening, with the screen retracting and extending laterally between upper and lower tracks across the opening. There is no way to extend the Poppema screen completely across only the lower portion of the doorway while leaving the upper portion open, as provided by the present invention.

Finally, International Patent No. WO 03/102,345 published on Dec. 11, 2003, titled "Take Up-Type Screen Device Whose Lock Is Releasable From Either Inside Or Outside," describes (according to the drawings and English abstract) yet another roll-up screen having a surrounding frame which must be permanently installed within a doorway or the like. The same points noted above in the discussion of the Todd et al. '254 and Poppema '070 U.S. Patents discussed immediately above, i.e., the permanent blockage of the doorway by an intermediate track or guide component if such a device were installed to extend only partially vertically up the doorway, applies here as well.

None of the above inventions and patents, taken either singly or in combination, is seen to describe the instant invention as claimed. Thus, a retractable pet guard solving the aforementioned problems is desired.

SUMMARY OF THE INVENTION

The present retractable pet guard serves to prevent a small pet (or small child or toddler) from escaping through a doorway which has been opened to permit some transaction to occur therethrough, e.g., package delivery, voice communication, etc. The present pet guard essentially comprises a retractable screen or net, which rolls onto a spring-biased roller within a housing. The housing may be temporarily secured to either the latch edge of the door or to the latch side of the jamb for extension across the lower portion of the opening therebetween when the door is opened.

The screen or net is relatively low and extends from the lower edge of the doorway and door up to about the height of the doorknob and latch above the floor, more or less. This is sufficient to keep small pets quickly jumping or climbing the barrier, and to keep small children and toddlers from escaping over the barrier.

As the roller is constantly urging the screen or net to a retracted condition, the device is pulling the door closed when it is extended across the open doorway. Accordingly, a stop may be provided to extend downwardly from the housing and to frictionally engage the underlying surface to hold the door open. A retraction lock may also be provided on the housing, to prevent the retraction of the screen or net if so desired. The present pet guard is also adaptable for use in a window opening or the like, where it may be installed either vertically or horizontally within the window opening and extended between the sill and the window frame or laterally across the window opening.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of a retractable pet guard, adapted for preventing pets (or even small children or toddlers) from escaping through an otherwise open doorway when some transaction (e.g., purchase, conversation, etc.) is taking place through the open doorway. The present guard may also be used as a retractable window screen in another embodiment.

Figure 1:
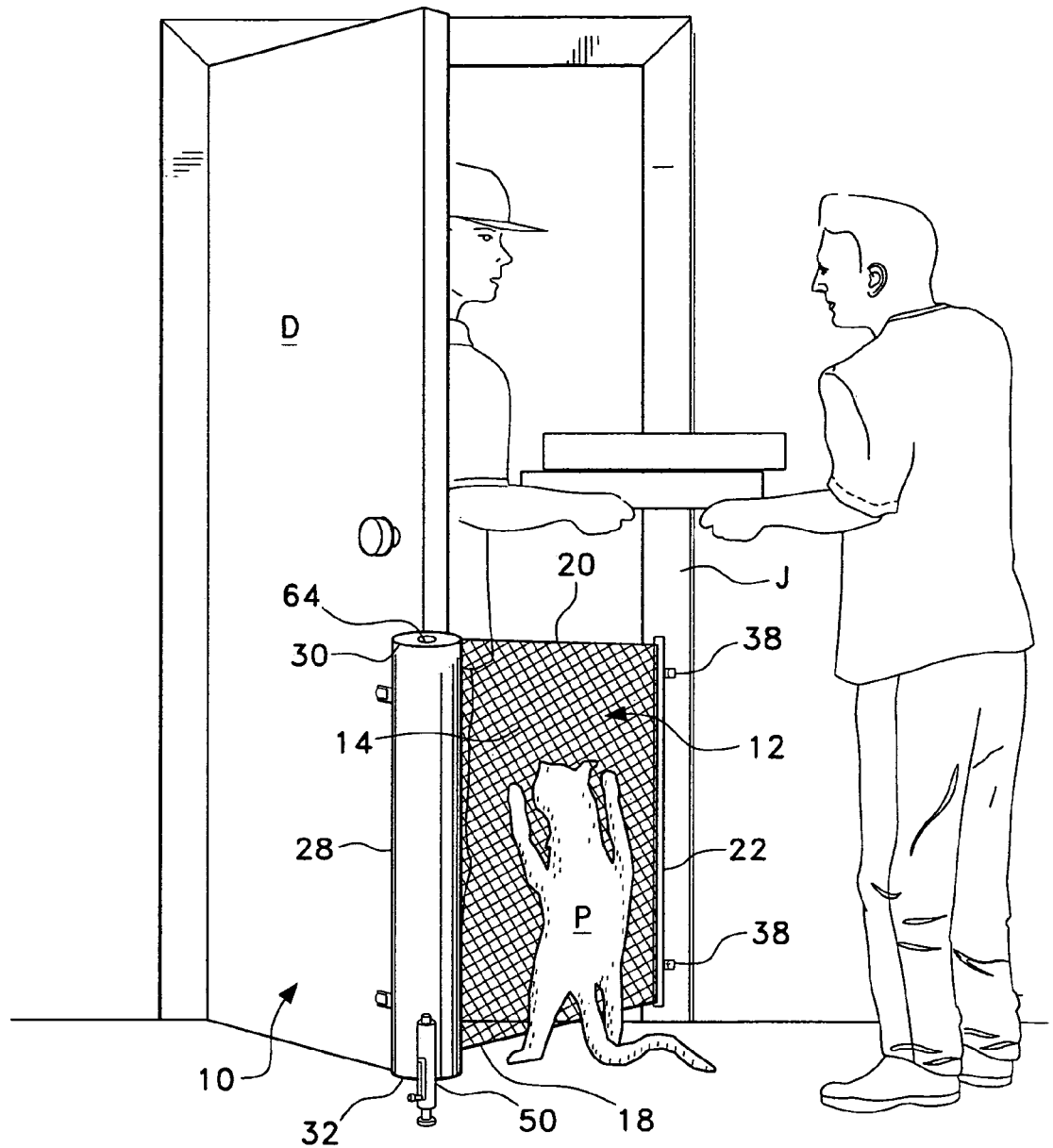
FIG. 1 is an environmental, perspective view of a retractable pet guard according to the present invention, showing its use in guarding an open doorway.
Figure 5:
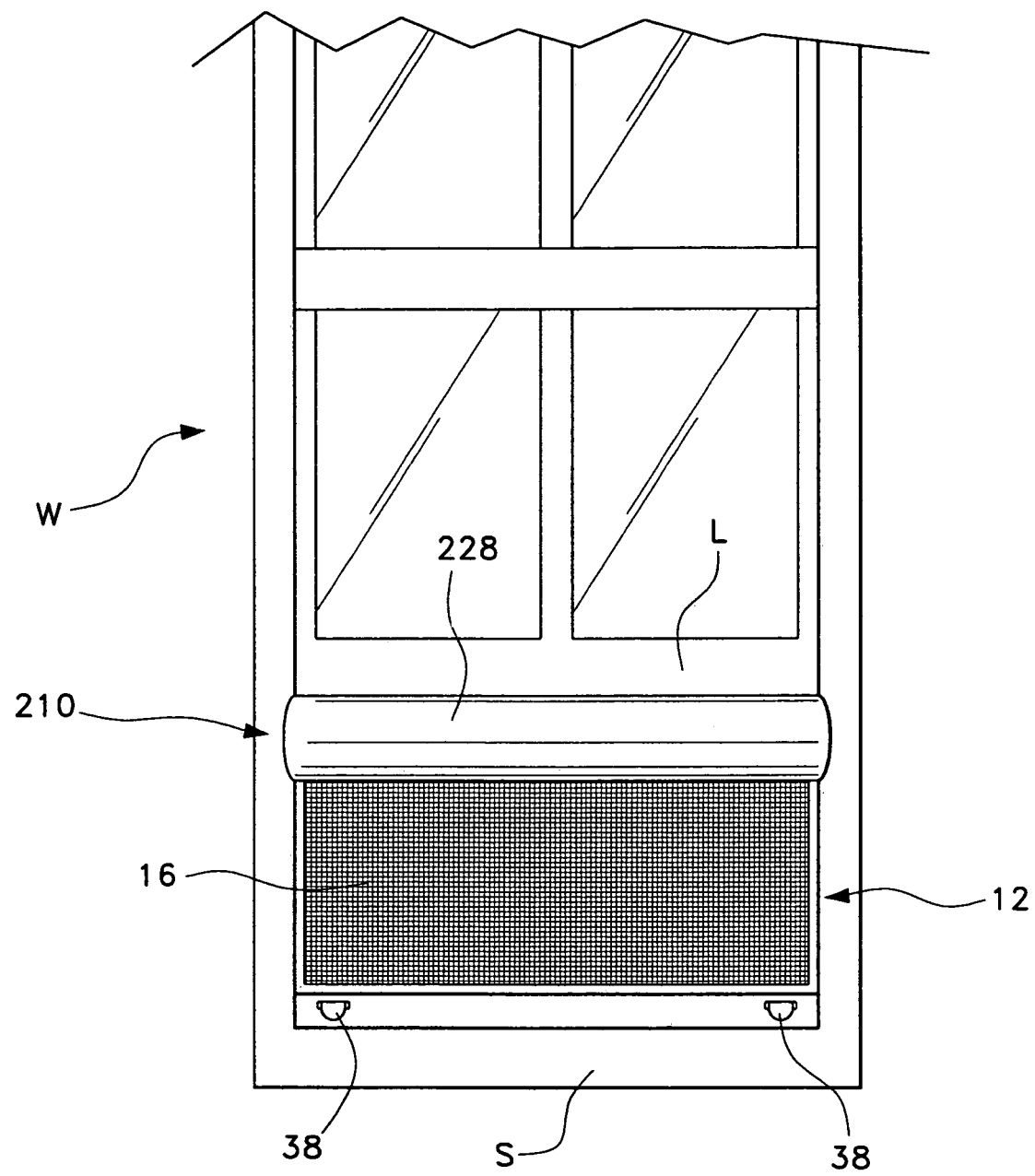
FIG. 5 is a perspective view of another alternate embodiment, in which the device is installed for vertical extension and retraction within a window opening.

FIG. 1 of the drawings provides an environmental illustration of the present pet guard 10 in its deployed state. The pet guard 10 generally comprises a flexible barrier 12, which may comprise a relatively coarse or wide gauge mesh net 14 as shown in FIG. 1, or may alternatively comprise a screen 16 or the like having a mesh of sufficiently narrow or fine gauge as to prevent the entry of insects and the like when deployed as a window screen, as shown in FIG. 5 of the drawings. The barrier 12 has a lower edge 18, an opposite upper edge 20, an extension edge 22, and an opposite roller attachment end portion 24, more clearly shown in FIG. 2 of the drawings.

Figure 2:
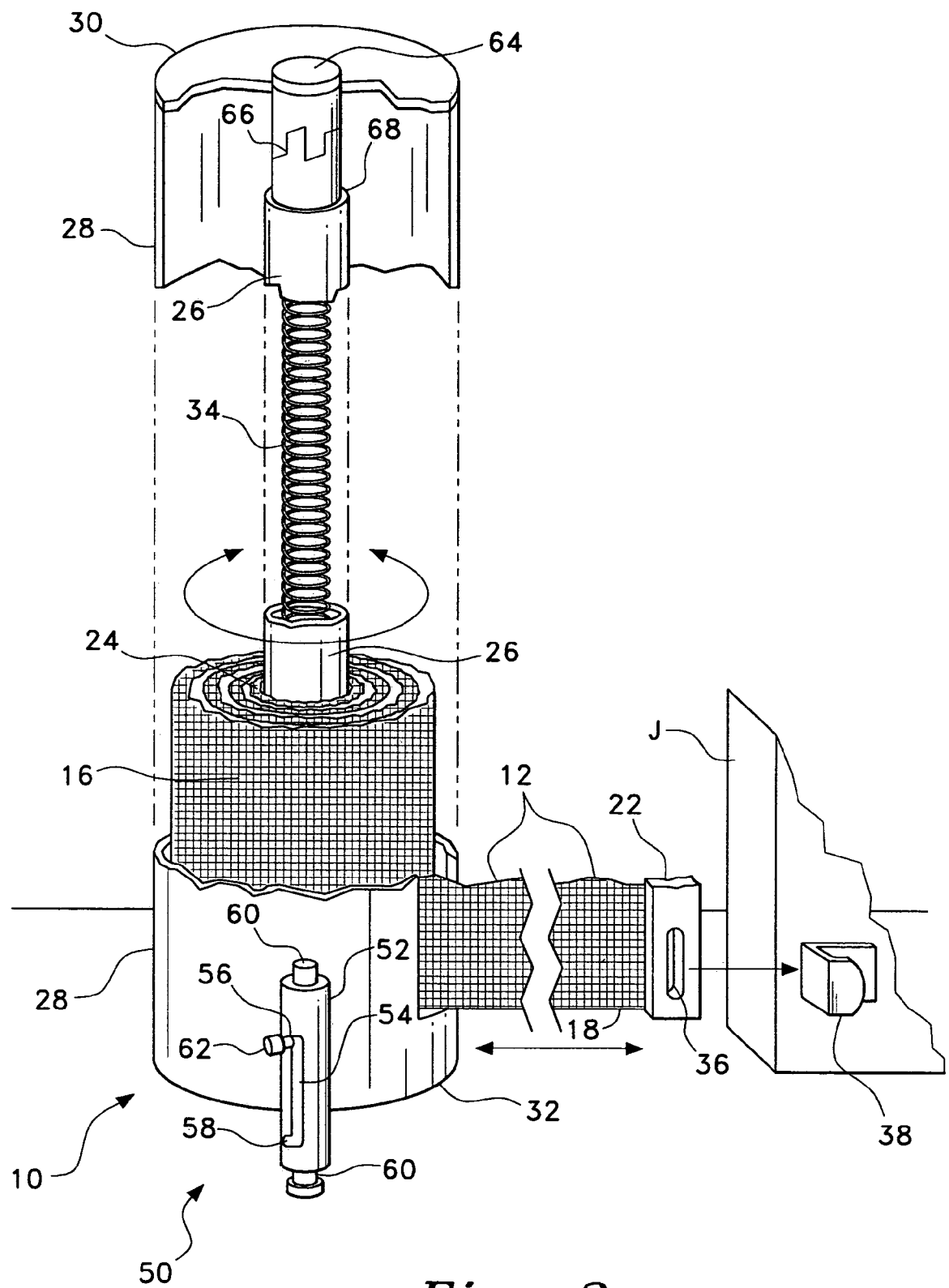
FIG. 2 is a partially broken away detailed perspective view of the present pet guard, showing the retraction mechanism, and other details.

FIG. 2 of the drawings also shows the various internal components of the winding mechanism which provides for the retraction of the barrier 12. The roller attachment end portion 24 of the barrier 12 is permanently secured to a barrier winding roller 26, which is in turn secured within a housing 28 between the upper and lower ends 30 and 32 thereof. The roller 26 is biased to wind the barrier 12 to its retracted state by a spring 34, which may be conventionally installed within the roller 26 in the manner used for roller type window shades and the like. The spring 34 thus has one end secured to the fixed cylindrical (or alternatively, another shape) housing 28, with its opposite end secured to the roller attachment end portion 24 of the barrier 12 to urge the barrier 12 to its retracted state, where it is essentially entirely contained within the housing 28.

The opposite extension edge 22 of the barrier 12 preferably comprises a rigid or semirigid component (plastic, etc.)

having at least one (and preferably two, although more could be provided) barrier extension edge attachment clip engaging slot(s) 36 therein. The slot(s) 36 removably attaches to a corresponding number of barrier extension edge attachment clips 38 (e.g., the flattened hook configuration illustrated in FIG. 2, or other suitable shape for engaging the barrier extension edge 22) which are permanently secured to the doorway, e.g., to the latch side of the door frame or jamb J as shown in FIG. 1, although the assembly may be reversed with the clips being attached to the latch edge of the door D and the housing attached to the jamb J, if so desired.

Figure 3:
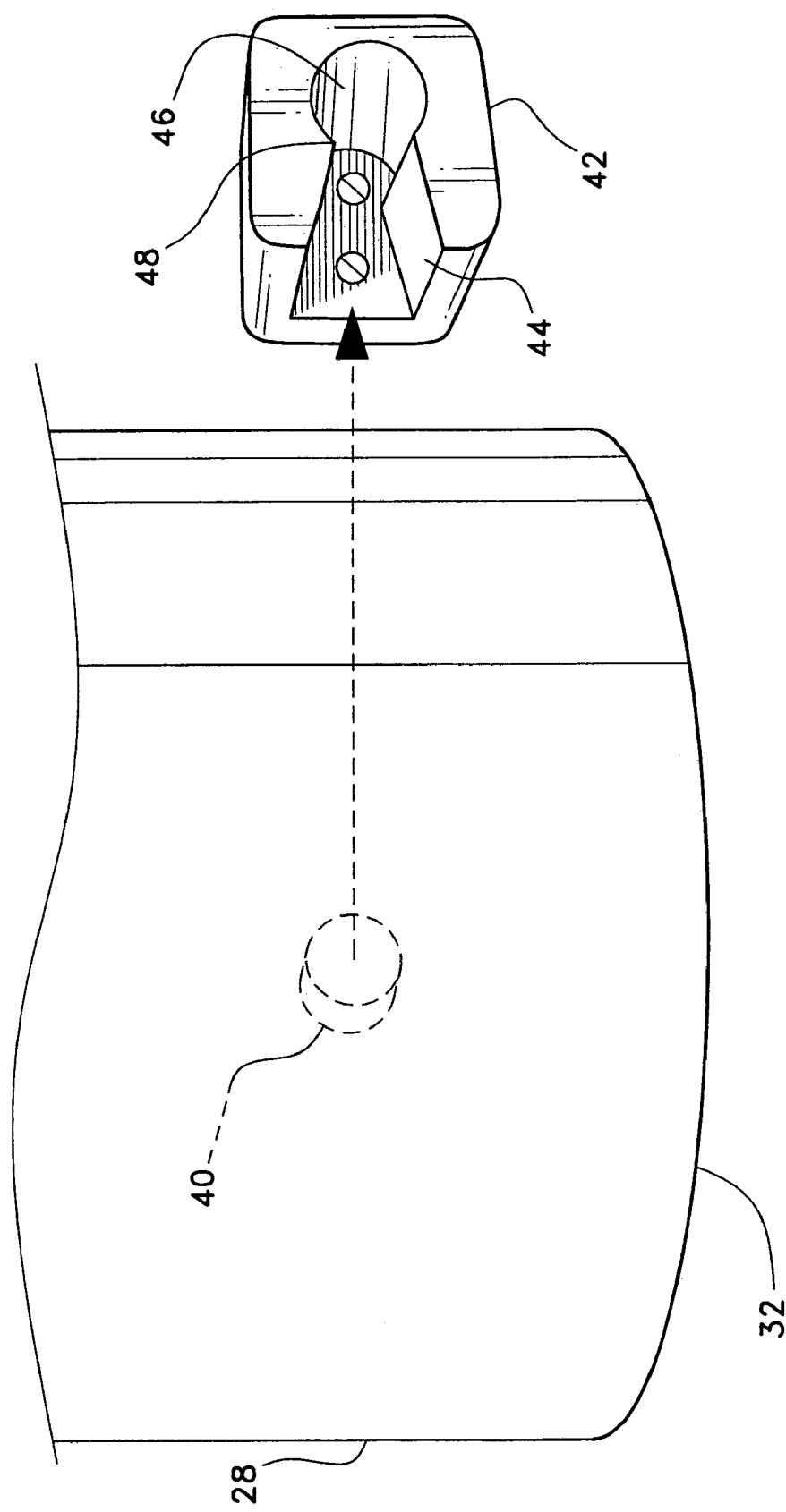
FIG. 3 is an exploded detailed perspective view of the clip assembly allowing the retraction housing to be temporarily secured to a door or door frame.

The housing 28 includes at least one (and preferably a pair, or more of) doorway attachment fitting(s) 40, which attaches removably to a housing attachment clip 42 which is permanently secured to the door D, or alternatively to the door jamb J if the installation is reversed from that shown in FIG. 1. FIG. 3 of the drawings provides an illustration of the attachment fitting 40 and clip 42 assembly. The housing attachment clip 42 essentially comprises a small block having a V-shaped lateral slot 44 formed therein, which communicates with a socket 46 formed at its apex. The doorway attachment fitting 40 may comprise a protuberance extending from the back of the housing 28. The fitting 40 is dimensioned so that it forms an interference fit within the neck 48 of the V-shaped slot 44 of the housing attachment clip 42, snapping into place in the socket 46 to temporarily and removably secure the housing 28 to the door D or door jamb J, depending upon the portion of the door assembly to which the housing attachment clip(s) 42 has/have been installed. It will be understood that other temporary, removable attachment configurations may be provided to secure the housing 28 to the door structure, as desired.

The present pet barrier 10 is installed in a doorway by first attaching the housing attachment clip(s) 42 to the latch edge of the door D. The housing 28 may be positioned in order to place the lower edge 18 of the barrier 12 at the desired height, e.g., an inch or so above the floor (or as desired) when the door D is opened. The clip(s) 42 is/are attached to the door structure accordingly. The extension edge 22 of the barrier 12 is positioned at the location where it will be temporarily secured during use, and the opposite barrier extension edge attachment clip(s) 38 are permanently secured in place.

The present pet barrier invention 10 is used by installing the housing 28 on its attachment clip(s) 42 as shown in FIG. 3 and described further above, and connecting the extension edge 22 of the barrier 12 to its respective attachment clip(s) 38. The barrier 12 will require little, if any, extension from the housing to accomplish this when the door D is closed, as the extension edge attachment clip(s) 38 will be immediately adjacent the housing 28 in such a situation. When the door D is opened, as shown in FIG. 1, the extension edge 22 of the barrier 12 is secured to the fixed door jamb J, while the housing 28, with the remainder of the barrier 12 rolled therein, is swung away from the jamb J as the door D is opened. This results in the barrier 12 being deployed automatically across the lower portion of the door opening, generally as shown in FIG. 1, and preventing the escape of any pets P, or perhaps a small child or toddler, through the open doorway while a transaction is taking place therethrough. It will be seen that the positions of the various attachment clips 38 and 42 may be reversed to secure the housing 28 to the fixed door jamb J, if so desired, and/or identically configured clips may be provided to allow the housing 28 to be secured to either the edge of the door D or to the jamb J, as desired.

Due to the tensile force of the spring 34 applied to the barrier 12, the barrier 12 will tend to retract back into the housing 28 when extended. This will cause the door D to tend to swing closed, which may cause some difficulty in negotiating a transaction through the open doorway. Accordingly, the present invention includes means for preventing door closure when the barrier 12 is deployed, or eliminating the retractile force on the barrier 12 while it is deployed.

The housing 28 may include a retractable door stop 50 extending downwardly from the lower end 32 thereof, as shown in detail in FIG. 2 of the drawings. The door stop 50 comprises a fixed sleeve 52 having an axially disposed slot 54 with opposed semicircumferential extensions 56 and 58 formed therein. A bolt 60 is slidably disposed within the sleeve 52, with a radially disposed pin 62 extending from the bolt 60 and captured within the slot 54 and its extensions 56 and 58. When it is desired to hold the door D open, the radial pin 62 is moved from its upper position in the upper slot extension 56 and slid downwardly in the axial slot 54, and secured in the lower slot extension 58. This extends the bolt 60 and locks it in its extended position, where its distal end is in frictional contact with the underlying floor or other surface to hold the door D open. The pin 62 may be manipulated by a toe to preclude bending down to position the device. Alternatively an extension could be provided up the side of the housing 28, if so desired, to enable the device to be manipulated by hand without needing to bend over.

Another means of preventing door closure while the barrier 12 is deployed may be provided by a barrier retraction lock 64 disposed in the upper end 30 of the housing 28. The lock 64 may have an alternating engaged/disengaged mechanism 66 to alternatingly drive a brake against the upper end 68 of the roller 26, somewhat like a ball point pin retraction and extension mechanism. Other means of locking the roller 26 to prevent the retraction of the barrier 12 may be provided as desired.

Figure 4:
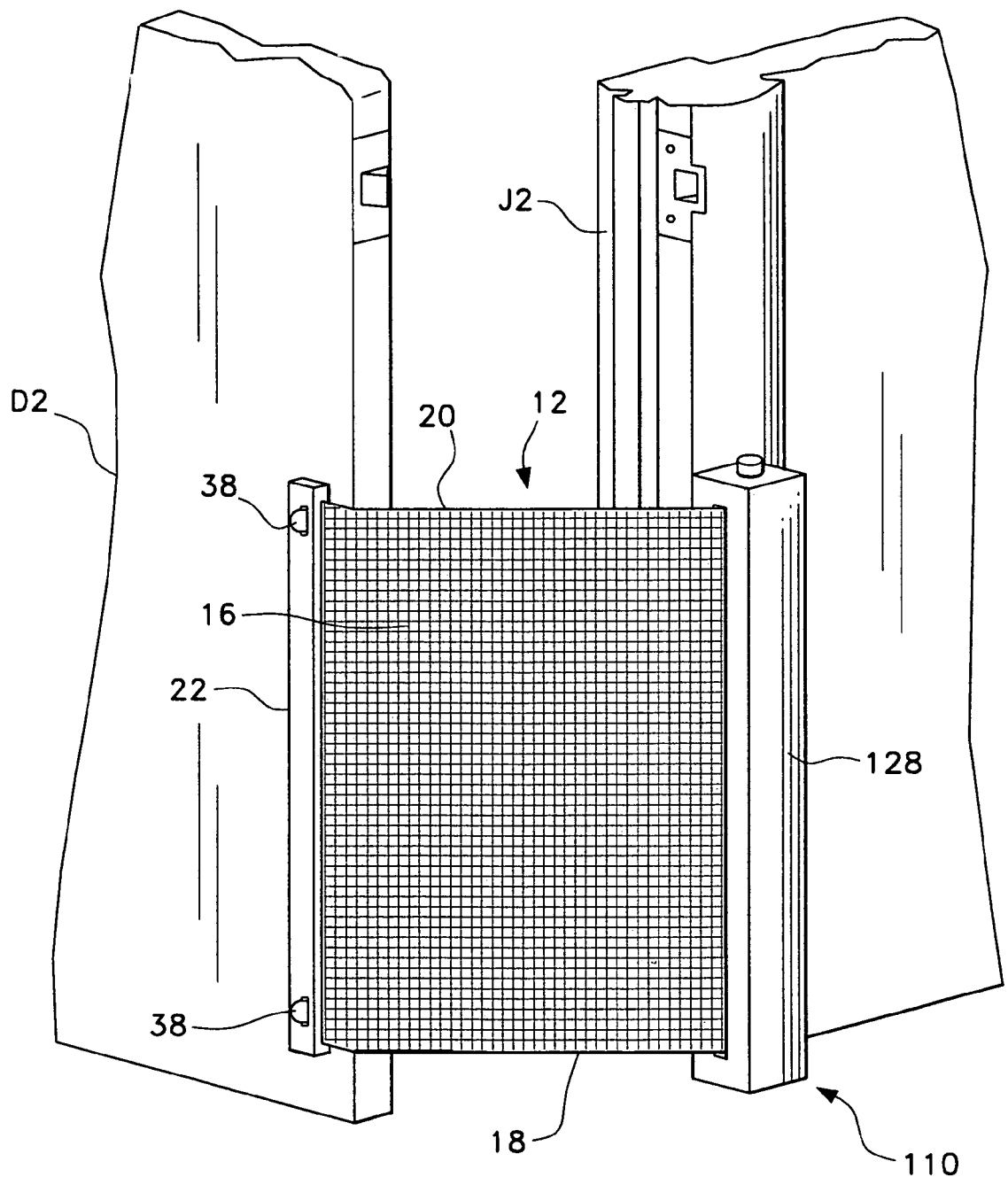
FIG. 4 is a perspective view of an alternate embodiment of the present pet guard, illustrating a housing having a rectangular cross section secured to the door jamb.

FIG. 4 of the drawings illustrates an alternative embodiment of the present pet barrier, designated as barrier assembly 110. The barrier 110 includes most of the features of the barrier 10 illustrated in FIGS. 1 through 3 and described in detail further above, but the housing 128 will be seen to have a square or rectangular cross section, rather than the round cross section of the housing 28 of the embodiment of FIGS. 1 through 3. The internal components, i.e., roller attachment end of the barrier 12, roller 26, retraction spring 34, etc., may be identical in the two embodiments. It will also be noted that the housing 128 is shown secured to the door jamb J2 in FIG. 4, with the barrier extension edge 22 being temporarily secured to the attachment clips 38 along the latch edge of the door D2. This opposite arrangement from that shown for the first embodiment 10 in FIG. 1 may be used with the embodiment 10, and/or the embodiment 110 of FIG. 4 may be secured to the door assembly per the arrangement shown in FIG. 1, if so desired. The only restriction on the alternate installation configurations, is the positioning of any door stop or retraction lock mechanisms at one end or the other of the housing 28 or 128.

FIG. 5 illustrates yet another embodiment of the present invention, designated as pet guard 210. The guard 210 is essentially the same device as the pet guard 10 illustrated in FIGS. 1 through 3, but the barrier 12 is formed of a much finer gauge of mesh, as in a window screen or the like. The guard 210 is easily installed within a window opening in a conventional double hung window W, with the window W having a generally horizontal window sill member S and a vertically openable lower sash with a generally horizontal lower member L. The length of the housing 228 and the corresponding width of the screen 16 are dimensioned to fit closely between the opposite sides of the window frame, in order to preclude gaps therealong which could admit insects or the like. One or more (preferably two) barrier edge extension attachment clips 38 are secured to the sill S, with the lower member L of the lower sash having one or more housing attachment clips 42 installed thereon (not shown in FIG. 5, but having essentially the same arrangement as that shown in FIG. 3 for the barrier 10).

The housing 210 may be temporarily and removably secured to the lower member L of the lower sash by means of the clips 42, with the extension edge of the screen 16 being temporarily secured to the sill S by means of the clips 38. When the lower window sash is raised, the housing 210 is raised with the sash, automatically deploying the screen 16 across the window opening. It will be understood that this arrangement may be reversed, with the housing 210 secured to the sill S and the extension hooked to the lower member L of the sash if so desired. The primary purpose of the present barrier is to prevent the escape of pets through an open doorway, but it will be seen that the installation shown in FIG. 5 also serves to prevent the escape of pets (or even small children or toddlers) through an open window. By forming the barrier as a fine mesh screen 16, it will also serve to preclude the entry of insects and the like into the room.

In conclusion, the present retractable pet guard, in its various embodiments, greatly increases the peace of mind of pet owners and parents of very small children when they have occasion to open the door of their home or apartment. The present guard is easily installed, requiring only a very few permanently installed components which may be installed in only a few minutes. Once the permanently installed clips and fasteners are secured in place, the guard is easily snapped in place and the extension end of the net or screen secured to the opposite side of the doorway. The barrier automatically deploys across the lower portion of the doorway whenever the door is opened, automatically blocking the passage of pets and/or small children therethrough while the upper portion of the doorway remains open for transactions, conversation, etc. therethrough.

The present pet guard may also be installed as an automatically deploying window screen in certain embodiments, if so desired. Accordingly, the present pet guard will be much appreciated by pet owners and parents of small children who have had difficulty in restraining their pets or children while simultaneously conducting business through an open doorway.

It is to be understood that the present invention is not limited to the embodiments described above, but encompasses any and all embodiments within the scope of the following claims.

I claim:

1. A retractable pet guard for retractably extending across the lower portion of a doorway assembly between the door and door frame, the pet guard comprising:
   a flexible barrier having a lower edge, an upper edge opposite the lower edge, an extension edge, and a roller attachment portion opposite the extension edge;
   a housing adapted for being removably secured to the lower portion of the doorway assembly, and having an upper end and a lower end opposite the upper end;
   a barrier winding roller disposed within said housing and extending between the upper end and the lower end of said housing, the roller attachment portion of said barrier being attached to said barrier winding roller;
   a retraction spring disposed within said housing, biasing said barrier winding roller and said barrier to a retracted state;
   a retractable door stop extending downwardly from said housing;
   said retractable door stop comprising a fixed sleeve having an axially disposed slot with opposed semicircumferential extensions formed therein, a bolt slidably disposed within said sleeve, and a radially disposed pin extending from said bolt, said bolt being captured within said slot of said sleeve; and
   at least one barrier extension edge attachment clip adapted for being permanently secured to the doorway assembly opposite said housing; whereby
   the extension edge of said barrier is temporarily and removably secured to said barrier extension edge attachment clip and said barrier is extended from said housing across the doorway as the door is opened, thereby preventing escape of pets and small children through the open doorway and allowing transactions to take place through the open doorway above said barrier.

2. The retractable pet guard according to claim 1, wherein said barrier comprises a large mesh gauge net.

3. The retractable pet guard according to claim 1, wherein said barrier comprises a small mesh gauge screen.

4. The retractable pet guard according to claim 1, further including:
   at least one housing attachment clip adapted for being permanently secured to the doorway assembly;
   at least one doorway attachment fitting extending from said housing, temporarily and removably attached to said at least one housing attachment clip of the doorway assembly.

5. The retractable pet guard according to claim 4, wherein:
   said at least one housing attachment clip comprises a block having a V-shaped lateral slot formed therein, communicating with a socket; and
   said at least one doorway attachment fitting comprises a protuberance having an interference fit within said V-shaped lateral slot of said housing attachment clip.

6. The retractable pet guard according to claim 1, wherein:
   said at least one barrier extension edge attachment clip comprises a flattened hook; and
   the extension edge of said barrier has at least one barrier extension edge attachment clip engaging slot defined therein.

7. The retractable pet guard according to claim 1, further including a retraction lock extending from the upper end of said housing.

8. The retractable pet guard according to claim 1, wherein said housing has a generally cylindrical cross section.

9. The retractable pet guard according to claim 1, wherein said housing has a generally rectangular cross section.

* * * * *